(12) United States Patent
Auerbach et al.

(10) Patent No.: US 8,275,839 B2
(45) Date of Patent: Sep. 25, 2012

(54) METHODS AND SYSTEMS FOR PROCESSING EMAIL MESSAGES

(75) Inventors: David Benjamin Auerbach, Brooklyn, NY (US); Omar Habib Khan, Toronto (CA); Stephen R. Lawrence, Mountain View, CA (US); Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 647 days.

(21) Appl. No.: 10/814,999

(22) Filed: Mar. 31, 2004

(65) Prior Publication Data

US 2005/0223061 A1   Oct. 6, 2005

(51) Int. Cl.
   *G06F 15/16*   (2006.01)
(52) U.S. Cl. ......... 709/206; 709/202; 709/203; 707/102
(58) Field of Classification Search ................. 709/206, 709/224, 202, 203; 707/102
   See application file for complete search history.

(56) References Cited

U.S. PATENT DOCUMENTS

| | | | |
|---|---|---|---|
| 4,410,957 A | 10/1983 | Cason et al. | |
| 5,280,612 A | 1/1994 | Lorie et al. | |
| 5,305,205 A | 4/1994 | Weber | |
| 5,321,838 A | 6/1994 | Hensley et al. | |
| 5,539,809 A | 7/1996 | Mayer et al. | |
| 5,555,346 A * | 9/1996 | Gross et al. ............ | 706/45 |
| 5,566,336 A | 10/1996 | Futatsugi et al. | |
| 5,592,378 A | 1/1997 | Cameron et al. | |
| 5,623,652 A | 4/1997 | Vora et al. | |
| 5,701,469 A | 12/1997 | Brandli et al. | |
| 5,742,816 A | 4/1998 | Barr et al. | |
| 5,748,954 A | 5/1998 | Mauldin | |
| 5,781,192 A | 7/1998 | Kodimer | |
| 5,793,948 A | 8/1998 | Asahi et al. | |
| 5,819,273 A | 10/1998 | Vora et al. | |
| 5,845,300 A | 12/1998 | Comer et al. | |
| 5,872,976 A | 2/1999 | Yee et al. | |
| 5,881,315 A | 3/1999 | Cohen | |
| 5,907,836 A | 5/1999 | Sumita et al. | |
| 5,913,208 A | 6/1999 | Brown et al. | |
| 5,940,594 A | 8/1999 | Ali et al. | |
| 5,956,722 A | 9/1999 | Jacobson | |
| 5,961,610 A | 10/1999 | Kelly et al. | |

(Continued)

FOREIGN PATENT DOCUMENTS

JP   2000-099441   4/2000

(Continued)

OTHER PUBLICATIONS

U.S. Appl. No. 10/749,440, filed Dec. 31, 2003, Badros et al.

(Continued)

*Primary Examiner* — John Follansbee
*Assistant Examiner* — Glenford Madamba
(74) *Attorney, Agent, or Firm* — Fenwick & West LLP

(57) ABSTRACT

Systems and methods for processing email messages are described. In one embodiment, the occurrence of a condition is determined indicating at least one email message transfer of an email message by an email application, wherein determining the occurrence of the condition is external to the email application, the email message is identified, wherein the email message comprises event data, an email event is compiled from at least some of the event data, and the email event is indexed.

61 Claims, 4 Drawing Sheets

U.S. PATENT DOCUMENTS

| | | |
|---|---|---|
| 5,964,839 A | 10/1999 | Johnson et al. |
| 6,006,222 A | 12/1999 | Culliss |
| 6,014,665 A | 1/2000 | Culliss |
| 6,029,195 A | 2/2000 | Herz |
| 6,055,579 A | 4/2000 | Goyal et al. |
| 6,073,130 A | 6/2000 | Jacobson et al. |
| 6,078,916 A | 6/2000 | Culliss |
| 6,115,802 A | 9/2000 | Tock |
| 6,119,147 A | 9/2000 | Toomey et al. |
| 6,175,830 B1 | 1/2001 | Maynard |
| 6,182,065 B1 | 1/2001 | Yeomans |
| 6,182,068 B1 | 1/2001 | Culliss |
| 6,184,880 B1 | 2/2001 | Okada |
| 6,199,067 B1 | 3/2001 | Geller |
| 6,202,065 B1 | 3/2001 | Wills |
| 6,209,000 B1 | 3/2001 | Klein et al. |
| 6,226,630 B1 | 5/2001 | Bilmers |
| 6,236,768 B1 | 5/2001 | Rhodes et al. |
| 6,236,978 B1 | 5/2001 | Tuzhilin |
| 6,240,548 B1 | 5/2001 | Holzle et al. |
| 6,269,369 B1 | 7/2001 | Robertson |
| 6,275,820 B1 | 8/2001 | Navin-Chandra et al. |
| 6,275,957 B1 | 8/2001 | Novik et al. |
| 6,282,548 B1 | 8/2001 | Burner et al. |
| 6,321,228 B1 | 11/2001 | Crandall et al. |
| 6,341,371 B1 | 1/2002 | Tandri |
| 6,346,952 B1 | 2/2002 | Shtivelman |
| 6,347,374 B1 | 2/2002 | Drake et al. |
| 6,349,299 B1 | 2/2002 | Spencer et al. |
| 6,363,373 B1 | 3/2002 | Steinkraus |
| 6,370,563 B2 | 4/2002 | Murakami et al. |
| 6,393,421 B1 | 5/2002 | Paglin |
| 6,393,438 B1 | 5/2002 | Kathrow et al. |
| 6,401,239 B1 | 6/2002 | Miron |
| 6,446,076 B1 | 9/2002 | Burkey et al. |
| 6,477,585 B1 | 11/2002 | Cohen et al. |
| 6,480,837 B1 | 11/2002 | Dutta |
| 6,490,577 B1 | 12/2002 | Anwar |
| 6,513,036 B2 | 1/2003 | Fruensgaard et al. |
| 6,526,405 B1 | 2/2003 | Mannila et al. |
| 6,532,023 B1 | 3/2003 | Schumacher et al. |
| 6,560,655 B1 | 5/2003 | Grambihler et al. |
| 6,564,213 B1 | 5/2003 | Ortega et al. |
| 6,581,056 B1 | 6/2003 | Rao |
| 6,592,627 B1 | 7/2003 | Agrawal et al. |
| 6,604,236 B1 | 8/2003 | Draper et al. |
| 6,631,345 B1 | 10/2003 | Schumacher et al. |
| 6,658,423 B1 | 12/2003 | Pugh et al. |
| 6,662,226 B1 | 12/2003 | Wang et al. |
| 6,681,247 B1 | 1/2004 | Payton |
| 6,684,250 B2 | 1/2004 | Anderson et al. |
| 6,691,175 B1 | 2/2004 | Lodrige et al. |
| 6,694,353 B2 | 2/2004 | Sommerer |
| 6,697,838 B1 | 2/2004 | Jakobson |
| 6,707,471 B2 | 3/2004 | Funaki |
| 6,708,293 B2 | 3/2004 | Kaler et al. |
| 6,380,924 B1 | 4/2004 | Yee et al. |
| 6,728,763 B1 | 4/2004 | Chen |
| 6,772,143 B2 | 8/2004 | Hung |
| 6,779,030 B1 | 8/2004 | Dugan et al. |
| 6,782,381 B2 * | 8/2004 | Nelson et al. ................... 1/1 |
| 6,820,075 B2 | 11/2004 | Shanahan et al. |
| 6,826,553 B1 | 11/2004 | DaCosta et al. |
| 6,850,934 B2 | 2/2005 | Bates et al. |
| 6,853,950 B1 | 2/2005 | O-Reilly et al. |
| 6,864,901 B2 | 3/2005 | Chang et al. |
| 6,865,715 B2 | 3/2005 | Uchino et al. |
| 6,873,982 B1 | 3/2005 | Bates et al. |
| 6,877,027 B1 | 4/2005 | Spencer et al. |
| 6,879,691 B1 | 4/2005 | Koretz |
| 6,901,378 B1 | 5/2005 | Linker et al. |
| 6,907,577 B2 | 6/2005 | Tervo |
| 6,934,740 B1 | 8/2005 | Lawande et al. |
| 6,957,229 B1 | 10/2005 | Dyor |
| 6,963,830 B1 | 11/2005 | Nakao |
| 6,968,509 B1 | 11/2005 | Chang et al. |
| 6,981,040 B1 | 12/2005 | Konig et al. |
| 6,983,310 B2 | 1/2006 | Rouse et al. |
| 6,985,913 B2 | 1/2006 | Murata |
| 6,999,957 B1 | 2/2006 | Zamir et al. |
| 7,016,919 B2 | 3/2006 | Cotton et al. |
| 7,080,073 B1 | 7/2006 | Jiang et al. |
| 7,096,255 B2 | 8/2006 | Malik |
| 7,099,887 B2 | 8/2006 | Hoth et al. |
| RE39,326 E | 10/2006 | Comer et al. |
| 7,162,473 B2 | 1/2007 | Dumais et al. |
| 7,188,316 B2 | 3/2007 | Gusmorino et al. |
| 7,200,802 B2 | 4/2007 | Kawatani |
| 7,219,184 B2 | 5/2007 | Stojancic |
| 7,233,948 B1 | 6/2007 | Shamoon et al. |
| 7,240,049 B2 | 7/2007 | Kapur |
| 7,245,910 B2 | 7/2007 | Osmo |
| 7,249,158 B2 | 7/2007 | Naitou |
| 7,257,822 B1 | 8/2007 | Sambhus et al. |
| 7,265,858 B2 | 9/2007 | Park et al. |
| 7,328,242 B1 | 2/2008 | McCarthy et al. |
| 7,330,536 B2 | 2/2008 | Claudatos et al. |
| 7,337,448 B1 | 2/2008 | Dalia et al. |
| 7,343,365 B2 | 3/2008 | Farnham |
| 7,376,640 B1 | 5/2008 | Anderson et al. |
| 7,383,307 B2 | 6/2008 | Kirkland et al. |
| 7,412,491 B2 | 8/2008 | Gusler et al. |
| 7,437,444 B2 | 10/2008 | Houri |
| 7,441,246 B2 | 10/2008 | Auerbach et al. |
| 7,457,872 B2 | 11/2008 | Aton et al. |
| 7,467,390 B2 | 12/2008 | Gilgen et al. |
| 7,475,406 B2 | 1/2009 | Banatwala et al. |
| 7,499,974 B2 | 3/2009 | Karstens |
| 7,500,249 B2 | 3/2009 | Kampe et al. |
| 7,516,118 B1 | 4/2009 | Badros et al. |
| 7,546,602 B2 | 6/2009 | Hejlsberg et al. |
| 7,562,367 B1 | 7/2009 | Arad |
| 7,577,667 B2 | 8/2009 | Hinshaw et al. |
| 7,602,382 B2 | 10/2009 | Hinckley et al. |
| 7,634,546 B1 * | 12/2009 | Strickholm et al. .......... 709/207 |
| 7,650,403 B2 | 1/2010 | Koetke et al. |
| 7,941,439 B1 | 5/2011 | Lawrence et al. |
| 2001/0002469 A1 | 5/2001 | Bates et al. |
| 2001/0016852 A1 | 8/2001 | Peairs et al. |
| 2002/0042789 A1 | 4/2002 | Michalewicz et al. |
| 2002/0049608 A1 | 4/2002 | Hartsell et al. |
| 2002/0056089 A1 | 5/2002 | Houston |
| 2002/0059245 A1 | 5/2002 | Zakharov et al. |
| 2002/0059425 A1 * | 5/2002 | Belfiore et al. ............... 709/226 |
| 2002/0065802 A1 | 5/2002 | Uchiyama |
| 2002/0073076 A1 | 6/2002 | Xu et al. |
| 2002/0078256 A1 | 6/2002 | Gehman et al. |
| 2002/0087507 A1 | 7/2002 | Hopewell et al. |
| 2002/0091568 A1 | 7/2002 | Kraft et al. |
| 2002/0091972 A1 | 7/2002 | Harris et al. |
| 2002/0103664 A1 | 8/2002 | Olsson et al. |
| 2002/0116291 A1 | 8/2002 | Grasso et al. |
| 2002/0138467 A1 | 9/2002 | Jacobson et al. |
| 2002/0156760 A1 | 10/2002 | Lawrence et al. |
| 2002/0165903 A1 | 11/2002 | Zargham et al. |
| 2002/0174101 A1 | 11/2002 | Fernley et al. |
| 2002/0178383 A1 | 11/2002 | Hrabik et al. |
| 2002/0184224 A1 | 12/2002 | Haff et al. |
| 2002/0184406 A1 | 12/2002 | Aliffi |
| 2003/0001854 A1 | 1/2003 | Jade et al. |
| 2003/0018521 A1 | 1/2003 | Kraft et al. |
| 2003/0023586 A1 | 1/2003 | Knorr |
| 2003/0028506 A1 | 2/2003 | Yu |
| 2003/0028896 A1 | 2/2003 | Swart et al. |
| 2003/0036848 A1 | 2/2003 | Sheha et al. |
| 2003/0036914 A1 | 2/2003 | Fitzpatrick |
| 2003/0041112 A1 | 2/2003 | Tada et al. |
| 2003/0050909 A1 | 3/2003 | Preda et al. |
| 2003/0055816 A1 | 3/2003 | Paine et al. |
| 2003/0055828 A1 | 3/2003 | Koch et al. |
| 2003/0088433 A1 | 5/2003 | Young et al. |
| 2003/0097361 A1 | 5/2003 | Huang et al. |
| 2003/0123442 A1 | 7/2003 | Drucker et al. |
| 2003/0123443 A1 | 7/2003 | Anwar |
| 2003/0126136 A1 | 7/2003 | Omoigui |
| 2003/0130984 A1 | 7/2003 | Quinlan et al. |
| 2003/0131000 A1 | 7/2003 | Bates et al. |

| | | |
|---|---|---|
| 2003/0131061 A1 | 7/2003 | Newton et al. |
| 2003/0149694 A1 | 8/2003 | Ma et al. |
| 2003/0154071 A1 | 8/2003 | Shreve |
| 2003/0167266 A1 | 9/2003 | Saldanha et al. |
| 2003/0182480 A1 | 9/2003 | Varma et al. |
| 2003/0187837 A1 | 10/2003 | Culliss |
| 2003/0233366 A1 | 12/2003 | Kesselman |
| 2004/0002959 A1 | 1/2004 | Alpert et al. |
| 2004/0003038 A1 | 1/2004 | Huang et al. |
| 2004/0031027 A1 | 2/2004 | Hiltgen |
| 2004/0054737 A1 | 3/2004 | Daniell |
| 2004/0064447 A1 | 4/2004 | Simske et al. |
| 2004/0093317 A1 | 5/2004 | Swan |
| 2004/0095852 A1 | 5/2004 | Griner et al. |
| 2004/0098609 A1 | 5/2004 | Bracewell et al. |
| 2004/0103409 A1 | 5/2004 | Hayner et al. |
| 2004/0128285 A1 | 7/2004 | Green et al. |
| 2004/0133560 A1 | 7/2004 | Simske |
| 2004/0133561 A1 | 7/2004 | Burke |
| 2004/0141594 A1 | 7/2004 | Brunson et al. |
| 2004/0143569 A1 | 7/2004 | Gross et al. |
| 2004/0155910 A1 | 8/2004 | Chang et al. |
| 2004/0168150 A1 | 8/2004 | Ziv |
| 2004/0186848 A1 | 9/2004 | Kobashikawa et al. |
| 2004/0186896 A1 | 9/2004 | Daniell et al. |
| 2004/0187075 A1 | 9/2004 | Maxham et al. |
| 2004/0193596 A1 | 9/2004 | Defelice et al. |
| 2004/0203642 A1 | 10/2004 | Zatloufai et al. |
| 2004/0205773 A1 | 10/2004 | Carcido et al. |
| 2004/0215715 A1 | 10/2004 | Ehrich et al. |
| 2004/0230572 A1* | 11/2004 | Omoigui ............................ 707/3 |
| 2004/0235520 A1 | 11/2004 | Cadiz et al. |
| 2004/0254928 A1 | 12/2004 | Vronay et al. |
| 2004/0254938 A1* | 12/2004 | Marcjan et al. ............... 707/100 |
| 2004/0255301 A1 | 12/2004 | Turski et al. |
| 2004/0261026 A1 | 12/2004 | Corson |
| 2004/0267700 A1* | 12/2004 | Dumais et al. .................... 707/2 |
| 2004/0267756 A1 | 12/2004 | Bayardo et al. |
| 2005/0021542 A1 | 1/2005 | Irle et al. |
| 2005/0033803 A1 | 2/2005 | Vleet et al. |
| 2005/0050547 A1 | 3/2005 | Whittle et al. |
| 2005/0057584 A1* | 3/2005 | Gruen et al. .................. 345/752 |
| 2005/0060310 A1 | 3/2005 | Tong et al. |
| 2005/0060719 A1 | 3/2005 | Gray et al. |
| 2005/0076115 A1 | 4/2005 | Andrews et al. |
| 2005/0080866 A1 | 4/2005 | Kent, Jr. et al. |
| 2005/0108213 A1 | 5/2005 | Riise et al. |
| 2005/0108332 A1 | 5/2005 | Vaschillo et al. |
| 2005/0114021 A1 | 5/2005 | Krull et al. |
| 2005/0114487 A1 | 5/2005 | Peng et al. |
| 2005/0192921 A1 | 9/2005 | Chaudhuri et al. |
| 2005/0216482 A1 | 9/2005 | Ponessa |
| 2005/0251526 A1 | 11/2005 | Nayak |
| 2005/0262073 A1 | 11/2005 | Reed et al. |
| 2006/0031365 A1 | 2/2006 | Kay et al. |
| 2006/0085750 A1 | 4/2006 | Easton et al. |
| 2006/0106778 A1 | 5/2006 | Baldwin |
| 2006/0167704 A1 | 7/2006 | Nicholls et al. |
| 2006/0190470 A1 | 8/2006 | Lemnotis |
| 2006/0224553 A1 | 10/2006 | Chtcherbatchenko et al. |
| 2006/0288075 A1 | 12/2006 | Wu |
| 2007/0016556 A1 | 1/2007 | Ann et al. |
| 2007/0022155 A1 | 1/2007 | Owens et al. |
| 2007/0055689 A1 | 3/2007 | Rhoads et al. |
| 2007/0078860 A1 | 4/2007 | Enenkiel |
| 2007/0208697 A1 | 9/2007 | Subramaniam et al. |

FOREIGN PATENT DOCUMENTS

| | | |
|---|---|---|
| JP | 2001-5705 | 1/2001 |
| JP | 2003-242176 | 8/2003 |
| JP | 2003-296365 | 10/2003 |
| JP | 2004-062451 | 2/2004 |
| RU | 2138076 C1 | 9/1999 |
| WO | WO 01/62004 A2 | 8/2001 |
| WO | WO 02/069118 | 9/2002 |
| WO | WO 2005/006129 A2 | 1/2005 |

OTHER PUBLICATIONS 80-20 Software—Products—80-20 One Search, http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-techonologies.com/products/devonthink.php, printed Mar. 16, 2004.

dtSearch® -http://www.dtsearch.com/, printed Mar. 15, 2004.

Dumais, S., et al, "Stuff I've Seen: A System for Personal Information Retrieval and Re-Use," Microsoft Research, *SIGIR '03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher. A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New..., http://msdn.Microsoft.com/Longhorn/archive/default.aspx?pull+/library/en-us/dnwinfs/htm..., pp. 1-5, printed Apr. 21, 2004..

"Searching for the next Google—New trends are helping nimble startups elbow in to the plundered market," Red Herring—The Business of Technology, Mar. 9, 2004, http://redherring.com/PrintArticle. aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

Bengel, J., et al., "Archiving and Indexing Chat Utterances," Electrical Engineering and Computer-Science and Information Technology Telecommunications Center University of Kansas, 2003.

Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

PCT International Search Report and Written Opinion, PCT/US05/10687, Sep. 10, 2008, 14 Pages.

PCT International Search Report and Written Opinion, PCT/US05/10685, Jul. 3, 2008, 11 Pages.

Examination Report, European Patent Application No. 05731427.0, Jul. 28, 2008, 5 Pages.

European Examination Report, European Application No. EP 05731490.8, Jul. 7, 2008, 5 pages.

European Search Report, European Application No. EP 05731490.8, Apr. 28, 2008, 4 pages.

Bacon, J. et al., "Event Storage and Federation Using ODMG," 2000, pp. 265-281, vol. 2135, [online] Retrieved from the Internet<URL: http://citeseer.ist.psu.edu/bacon00event.html>.

Spiteri, M.D. et al., "An Architecture to Support Storage and Retrieval of Events," Sep. 1998, pp. 443-458, [online] Retrieved from the Internet<URL:http://citeseer.ist.psu.edu/spiteri98architecture.html>.

Spiteri, M.D., "An Architecture for the Notification, Storage and Retrieval of Events," Jan. 2000, pp. 1-165, [online] Retrieved from the Internet<URL:http://citeseer.ist.psu.edu/spiteri00architecture.html>.

Jonathan Bennett & AutoIt Team, "AutoIt v3 Homepage," Verson v3.0.102, 1999-2004, 26 pages, [online] [Archived on Aug. 13, 2004; Retrieved on Dec. 2, 2008] Retrieved from the internet <URL:http://web.archive.org/web/20040813195143/http://www.autoitscript.com/autoit3/docs/>.

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture of the Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

Budzik, J., "Information access in context," Knowledge-Based Systems, Elsevier 2001, pp. 37-53, vol. 14.

Gemmell, J., et al., "Living with a Lifetime Store," Proc. ATR Workshop on Ubiquitous Experience Media, Sep. 9-10, 2003, pp. 69-76.

Gemmell, J., et al., "The MyLifeBits Lifetime Store," Proceedings of the 2003 ACM SIGMM Workshop on Experimental Telepresence, Nov. 7, 2003, pp. 80-83.

Rekimoto, J., "Time-Machine Computing: A Time-centric Approach for the Information Environment," Proceedings of the Annual ACM Symposium on User Interface Software and Technology, Nov. 7, 1999, pp. 1-10.

First Examination Report for India Patent Application No. 2749/KOLNP/2006, Mar. 15, 2011, 2 pages.

\* cited by examiner

METHODS AND SYSTEMS FOR PROCESSING EMAIL MESSAGES

FIELD OF THE INVENTION

The invention generally relates to search engines. More particularly, the invention relates to methods and systems for processing email messages.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for processing email messages. In one embodiment, the occurrence of a condition is determined indicating at least one email message transfer of an email message by an email application, wherein determining the occurrence of the condition is external to the email application, the email message is identified, wherein the email message comprises event data, an email event is compiled from at least some of the event data, and the email event is indexed. Determining the condition can comprise one or more of determining if files associated with the email application have been updated, determining if an email related operating system condition has occurred, and determining if a packet received from a network comprises an email protocol. In another embodiment, emails can be associated with a conversation.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
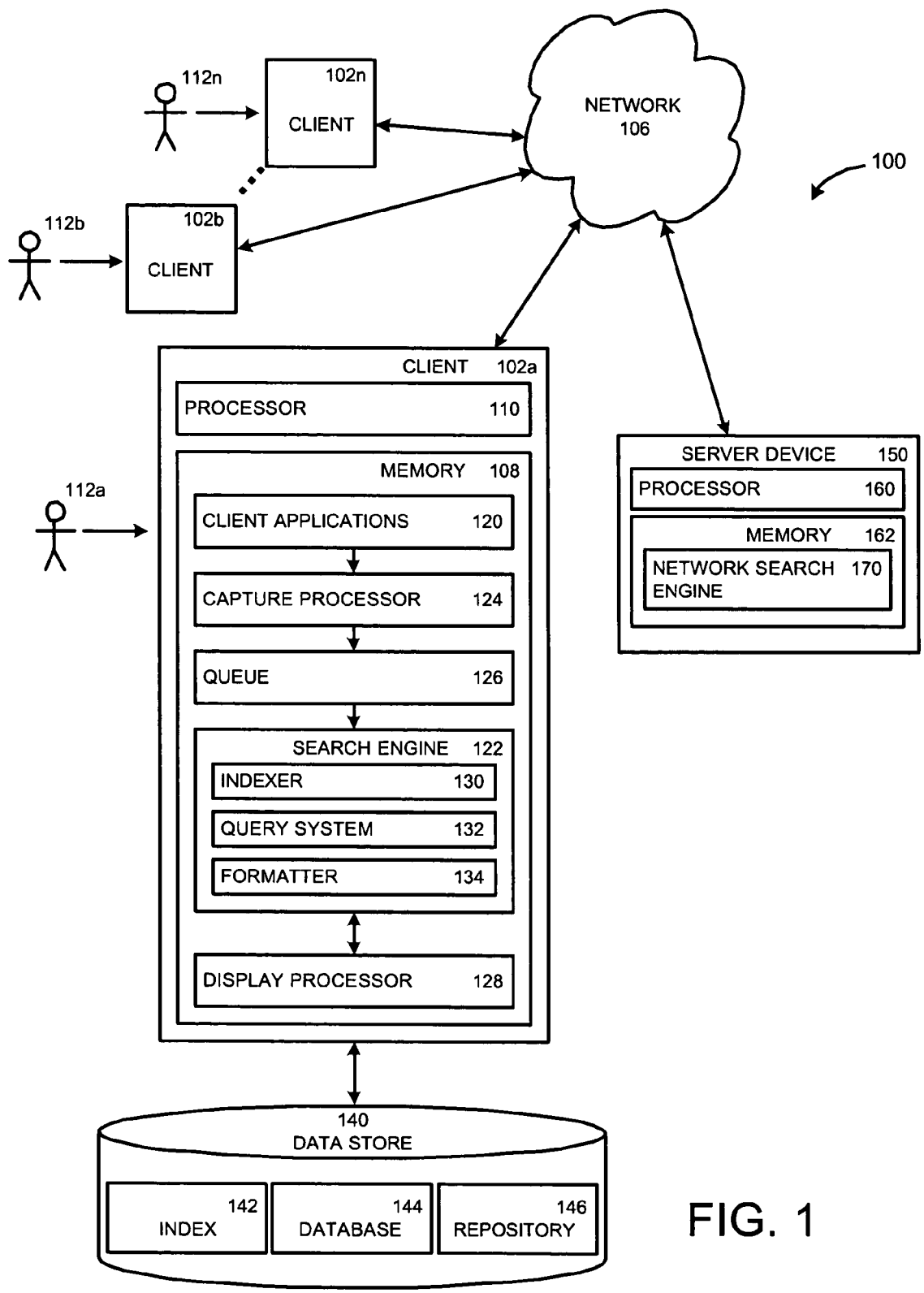
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102*a-n* that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102*a-n* shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 112a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an email message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the receipt of an email message by the user 112a can comprise the sender of the message, the recipients of the message, the time and date the message was received, and the content of the message.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprise a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an email message event received by the user 112*a* can include the sender, the recipient or list of recipients, the time sent, the date sent, and the content of the message. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired. An event schema can also contain location information as described above.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, and spreadsheet documents, the emails in a user's inbox, and the web pages book-marked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102*a*. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102*a* does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

In one embodiment, when the indexer 130 receives an event, the indexer 130 can determine, from the event, terms (if any) associated with the event, the time of the event (if available), images (if any) associated with the event, and/or other information defining the event. The indexer 130 can also determine if the event relates to other events and associate the event with related events. For example, for a received email event, the indexer 130 can associate the email event with other message events from the same conversation or string. The emails from the same conversation can be associated with each other in a conversation object, which can be stored in the data store 140.

The indexer 130 can send and incorporate the terms and times, associated with the event in the index 142 of the data store 140. The event can be sent to the database 144 for storage and the content of the associated article and any associated images can be stored in the repository 146. The conversation object associated with email messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VB, JAVA, or NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide a result set to the client device 102a via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIGS. 2-4.

Various methods in accordance with embodiments of the present invention may be carried out. For example, in one embodiment, the occurrence of a condition is determined indicating at least one email message transfer of an email message by an email application, wherein determining the occurrence of the condition is external to the email application, the email message is identified, wherein the email message comprises event data, an email event is compiled from at least some of the event data, and the email event is indexed. The email message transfer can comprise receiving the email message or sending the email message. Event data can comprise at least one of sender data, a date and time associated with the event, content from the email message, and a conversation ID. The email event and the email message can be stored. The email application can comprise a client-based email application and/or a network-based email application.

In one embodiment, determining the occurrence of the condition comprises determining if files associated with the email application have been updated. In another embodiment, determining the occurrence of the condition comprises determining if an email related operating system condition has occurred. The operating system condition can comprise an email icon output on a display associated with the client device, an email message box output on a display associated with the client device, and determining metadata for an email indicator associated with the email message displayed in the email application. In another embodiment, determining the occurrence of the condition comprises determining if a packet received from a network comprises an email protocol. For a network-based email application, determining the occurrence of the condition can, in one embodiment, comprise analyzing a web page associated with the network-based email application. In another embodiment determining the occurrence of the condition may comprise determining an email protocol and an email server based on analysis of settings associated with the email application or network traffic, and periodically polling the email server for new email messages.

In one embodiment, the email event is associated with a conversation. Associating the email message with a conversation can comprises determining if an existing conversation relevant to the email event exists, associating the email event with an existing conversation if the existing conversation is determined to be relevant to the email event, and associating the email event with a new conversation if no existing conversation is determined to exist that is relevant to the email event. Determining if an existing conversation relevant to the email event exists may comprise an analysis of the event data associated with the email event. The analysis of the event data may comprise analysis of one or more of email message subject, date, content, sender and recipients. Determining if an existing conversation relevant to the email event exists may comprise determining a conversation ID associated with the email message.

Figure 2:
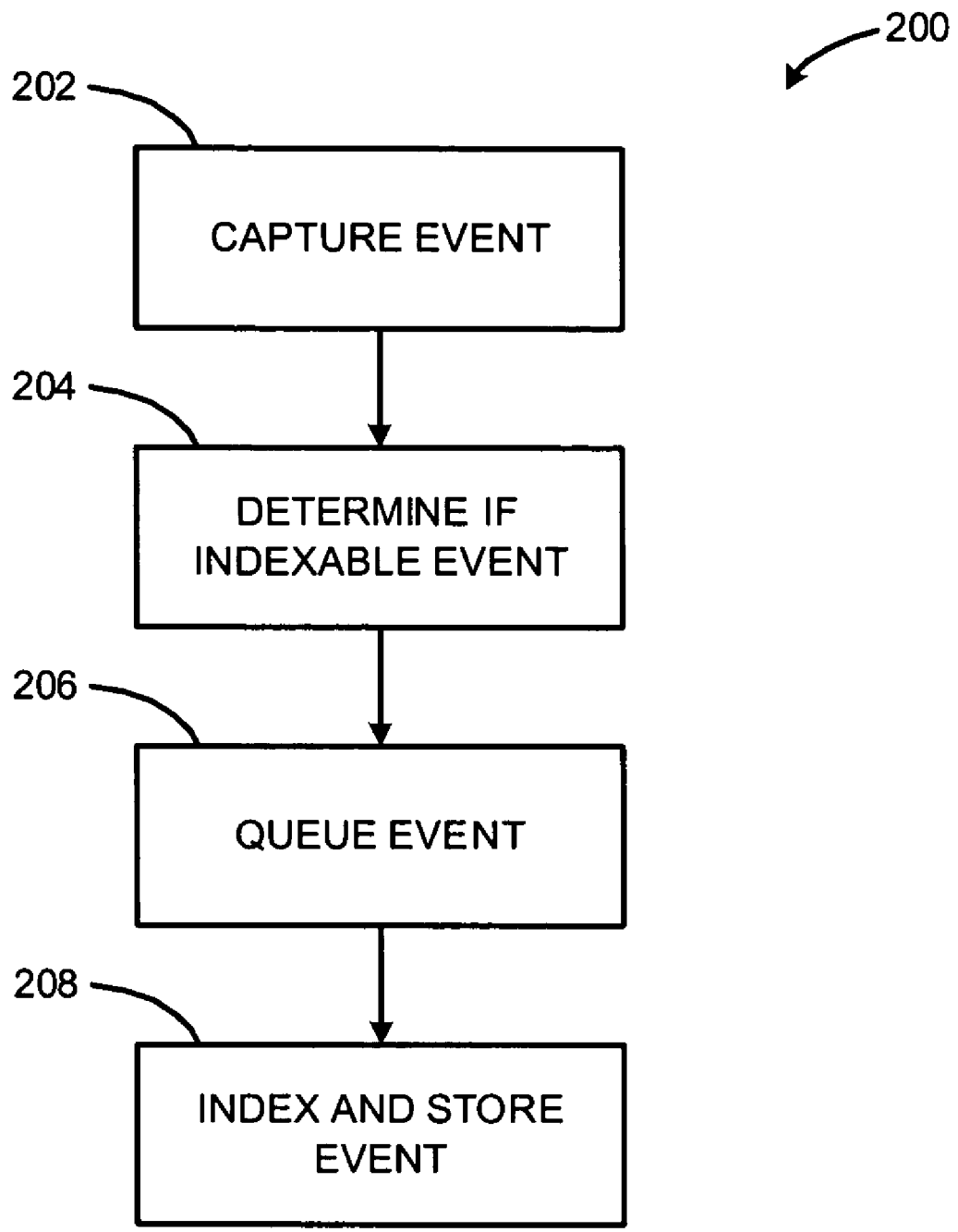
FIG. 2 is a flow diagram illustrating an exemplary method of capturing and processing event data associated with a client device in one embodiment of the present invention.

FIG. 2 illustrates an exemplary method 200 that provides a method for capturing and processing an event. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The event can be a real-time event or can be a historical event. The capture processor 124 can capture a real-time event by identifying and compiling event data associated with the event upon the occurrence of the event. The capture processor 124 can capture a historical event, for example, by periodically crawling the memory 108 or associated data storage device of the client device 112a for previously uncaptured articles or receiving articles or data from client applications and identifying and compiling event data associated with the event. The capture processor 124 may have separate capture components for each client application, network monitoring, performance data capture, keystroke capture, and display capture. In one embodiment, the capture component can use a generalized event definition mechanism, such as an event schema that it has previously defined and registered with the client device 102a, to capture or express the event.

Figure 3:
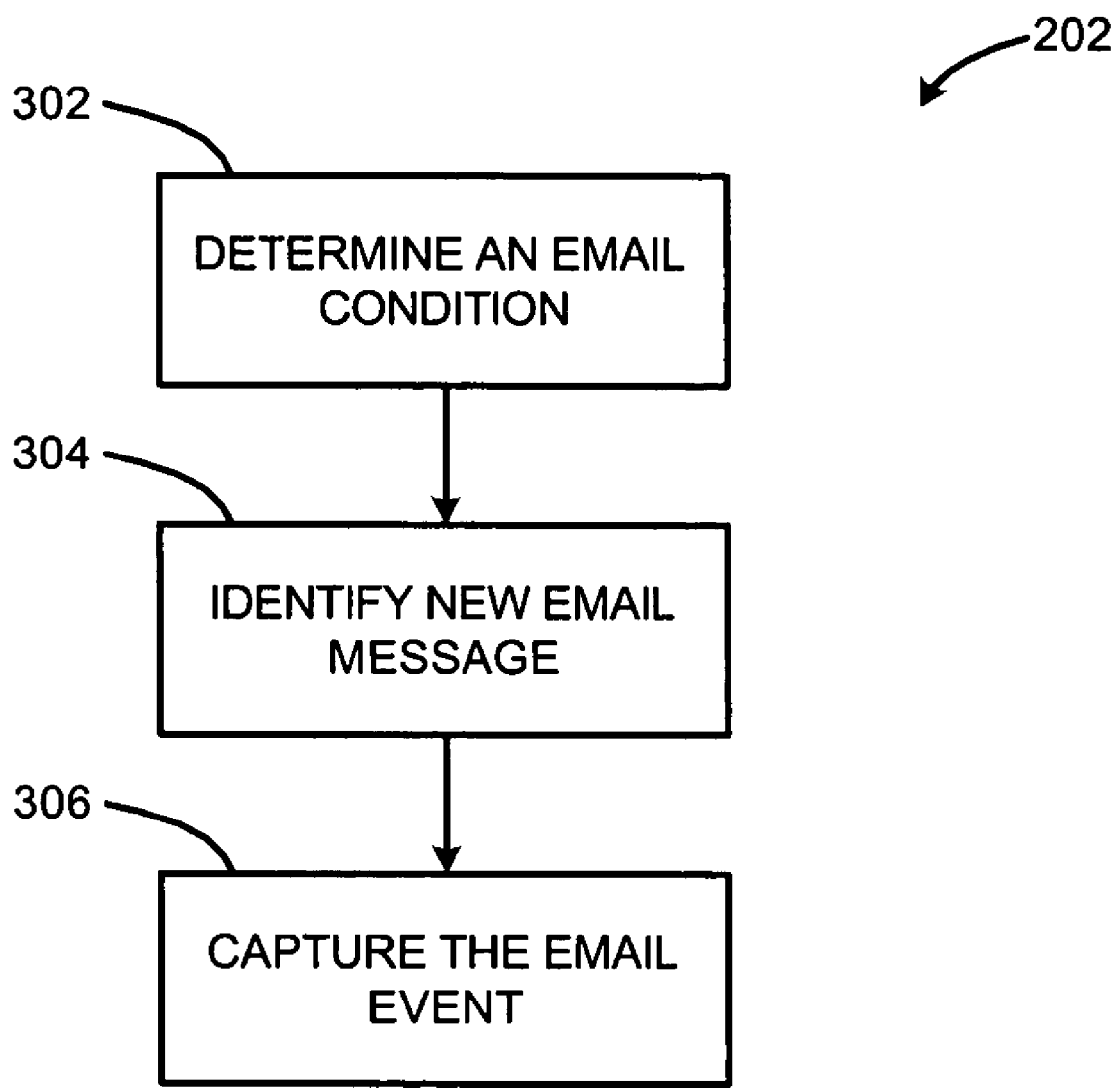
FIG. 3 is a flow diagram illustrating an exemplary method of capturing an email event in one embodiment of the present invention.

FIG. 3 illustrates an exemplary method 202 for capturing an email event involving an email message transfer by an email application. A message transfer can comprise the receipt of an email message or the sending of an email message. FIG. 3 illustrates an exemplary method for capturing an email event involving the receipt of an email message. It will be appreciated by those skilled in the art that this method can also apply to email messages that are sent, in addition to, or in lieu of email messages that are received. In 302, the occurrence of a condition is identified indicating the receipt of an email message by an email application on the client device 112a. Some conventional email applications have an application program interface (API) that can allow a capture component access to the email application to determine if an email has been received, to determine if an email has been sent, or to determine if other events associated with the application have taken place. Other conventional email applications do not provide APIs that can allow a capture component 124 to monitor the receipt of incoming email messages or sending of email messages through the email application. In this situation, the capture component 124 can determine the occurrence of a condition indicating an email message transfer, such as, for example, the receipt of an email message, without the use of an API or other express indication of an email message transfer from the email application. Therefore, the capture component 124 can determine the occurrence of a condition indicating an email message transfer external to or independent of the email application.

In one embodiment, the email capture component can periodically crawl files associated with the email application to determine if the files or other data such as registry entries have been updated since the last crawl. For example, a conventional email application can have one or more files associated with each email message folder. Each file can contain the email messages in the associated folder. The files can contain information, such as date and time, associated with the last update of the file. The email capture component can compare the current update information associated with each file with update information from a previous crawl of the files and determine if each file has been updated. If one or more of the files have been updated, this can act as a condition independent of the email application indicating that an email or emails have been received by the email application since the last crawl. Identifying that a file has been updated may be done by periodically checking metadata associated with the file such as the last update time or the size of the file, or may be done by registering with the operating system to receive notification when certain file changes occur. The update information may be that the update time for a file has been changed, subsequent analysis of the file may determine that a new message has been received, or that no new message has been received (for example, a message may have been deleted).

Alternatively the capture component can periodically inspect other resources associated with the email application. For example, the capture component can inspect registry entries or watch for operating system notifications regarding registry entries associated with the email application.

In another embodiment, the email capture component can monitor the operating system for conditions indicating the receipt of an email. The email capture component can, for example, monitor display calls by the operating system indicating the receipt of an email. For example, some operating systems can output an icon for display in a system tray indicating that an email message has been received by the email application. Identifying an email icon may comprise, for example, identifying a window with a specific identifier, such as a class name, or analyzing the pixels displayed on a display device. An operating system can also output a message window indicating that an email has been received by the email application. If an email application is open, metadata associated with email indicators can indicate that a new email message has been received. For example, newly received emails can be indicated in a bold font on the display of the email application. The email capture component can monitor display calls to determine the metadata associated with email message indicators. These operating system actions can act as a condition independent of the email application that indicates that an email has been received by the email application. In another embodiment, an operating system capture component can monitor and determine the operating system actions and upon determining a condition associated with the email application, the operating system capture component can indicate the occurrence of such condition to the email capture component.

In a further example, the email capture component can monitor packets received (or sent) by the client device 112*a* from (or to) the network 106 and can identify an email packet by the protocol used, for example POP and IMAP. For example, the email capture component can monitor incoming packets and when the capture component determines that an incoming packet is in an email protocol this can act as a condition independent of the email application that an email has been or will soon be received by the email application. Outgoing email messages may be monitored in a similar fashion. In another embodiment, a network capture component can monitor and determine the receipt of an email protocol packet and upon determining receipt of such packet, the network capture component can indicate the occurrence of such condition to the email capture component or actually capture the email content itself.

In another embodiment, the capture component can identify an email protocol, such as IMAP or POP, based on analysis of email client application settings or analysis of network traffic, and can subsequently determine and poll an email server, such as an IMAP or POP server, periodically to check for new mail. If new mail is received the capture component may retrieve the mail from the server without removing it or marking it as read (so the email application later retrieves it), or may instruct the email application to retrieve the message. This may allow the capture component to identify new mail faster than by waiting for the email application to check the email server. For example, the email application may not check for new mail unless the user activates the application.

In a further example, the email capture component can monitor HTML displayed in a network-based email application system such as Yahoo™ Mail or Hotmail™. Analysis of the HTML can identify a string that indicates new mail is available, or can identify new mail itself, such as mail listed in bold font in a listing of messages. This analysis can be done by using a browser plug-in such as a Browser Helper Object (BHO) or by analyzing the contents of the application window.

After the identification of a condition indicating the receipt of an email message, in 304, the email capture component can identify a new received email message or messages. In one embodiment, where the email application has an API that allows the email capture component to have access to the email application to determine the receipt of new email, the new email message can be identified by the email application.

In another embodiment, where the email capture component can determine the receipt of a new email or email independent of the email application, the email capture component can determine new received email messages. In this embodiment, the email capture component can identify a new email message by crawling the files associated with an email application. The email capture component can first determine which file or files have been updated since the last crawl as explained above (if this has not been done). For the file or files that have been updated, the email capture component can determine the new received email message or messages based on the date and time the email message was received by the email application. For example, the date and time of the last captured email previously captured by the capture component can be compared to the date and time associated with the email messages in the file(s). An email message with an associated date and time after the date and time of the last captured email message can be identified by the email capture component as a new email message.

In 306, the identified email event is captured. In one embodiment, the email capture component can capture the email event by compiling event data associated with the email event. In one embodiment, the email capture component can use an event schema to express the event data. For example, the event schema for an email event can include one or a combination of sender information, recipient information, time that the email message was received, a date that the email message was received, the subject of the email message and the content of the email message. The event schema can also contain a conversation ID. A conversation ID can indicate the particular conversation (sometimes referred to as a "thread") that the email message is associated with. The conversation ID can be provided by the email application or can be determined by the email capture component. In one embodiment, an email message can contain an identification number or numbers associated with other message(s) that the email message is related to, forming a chain of relationships that constitute a conversation.

In another embodiment, the conversation ID is determined based on analysis of one or more of the message subject, date, content, and author or recipients. In one embodiment, groups of messages with the same subject are given the same conversation ID, with the following refinements. Typically, certain reply indicators such as "Re:", "Fwd:", "Fw:", prepended to the subject may be used as indicators that the email is part of a previous thread. The text of the subject after these reply indicators (the normalized subject) can then be compared to previous normalized subjects. If the original subject has no reply indicators, the email may be part of a new conversation, and thus it may receive a new conversation ID. If there is no overlap between the authors and other recipients of the email messages, then email messages with the same normalized subject may be given different conversation IDs. For example, if person A sends person B and person C an email message with subject X, and the person D sends person B and person E an email message also with subject X, then these email messages and any subsequent replies may have separate conversation IDs, as the participants (other than the person whose email is being indexed) do not overlap. In another embodiment, if there is a gap of greater than a certain amount of time between messages, the subsequent messages are given a new conversation ID. In another embodiment, quoted text in the email can be compared to emails in potential threads to determine if they are related.

In another embodiment "related" conversations can be determined by inspecting the email message body and the email attachments.

Some email applications include the headers of the "related" email message(s) in the body of the current email message, while other email applications attach the "related" email message(s). In certain instances, the user may attach relevant email messages or threads to a new message. Extracting this information can allow the search engine 122 to provide the user with both the email conversation thread as well as "related" mail messages or conversations.

Returning to FIG. 2, in 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article, changing an article, and closing an article. In this embodiment, non-indexable events are not indexed or sent for storage by the indexer 130. Indexable events can be indexable real-time events or historical events. The receipt of an email message can be an indexable event.

If an indexable event is determined, then, in 206, the event can be sent by the capture processor 124 to the queue 126 with an indication that it is an indexable event. In the embodiment shown, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, then, in 206, the non-indexable event can be sent by the capture processor 124 to the user state queue of the queue 126 with an indication that it is not to be indexed.

In one embodiment, the queue 126 holds the event until the search engine is ready to receive it. Based on the event data, the event can be prioritized on the queue 126 for handling. For example, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. In another embodiment, a queue is not used and events are sent directly to the search engine 122 from the capture processor 124.

In 208, the indexer 130 indexes and stores the event. The indexer 130 can retrieve an event from the queue 126 when it is ready to process the event. In one embodiment, the indexer 130 determines if the event is a duplicate event and if not assigns an Event ID to the event. The indexer 130 can also associate the event with related events. In the embodiment shown in FIG. 2, the indexer determines indexable terms associated with the event, dates and times associated with the event, and other data associated with the event from the event schema. The indexer 130 can associate the Event ID with the indexable terms that are contained in the index 142. The event can be stored in the database 144 and the content of the event can be stored in the repository 146.

Figure 4:
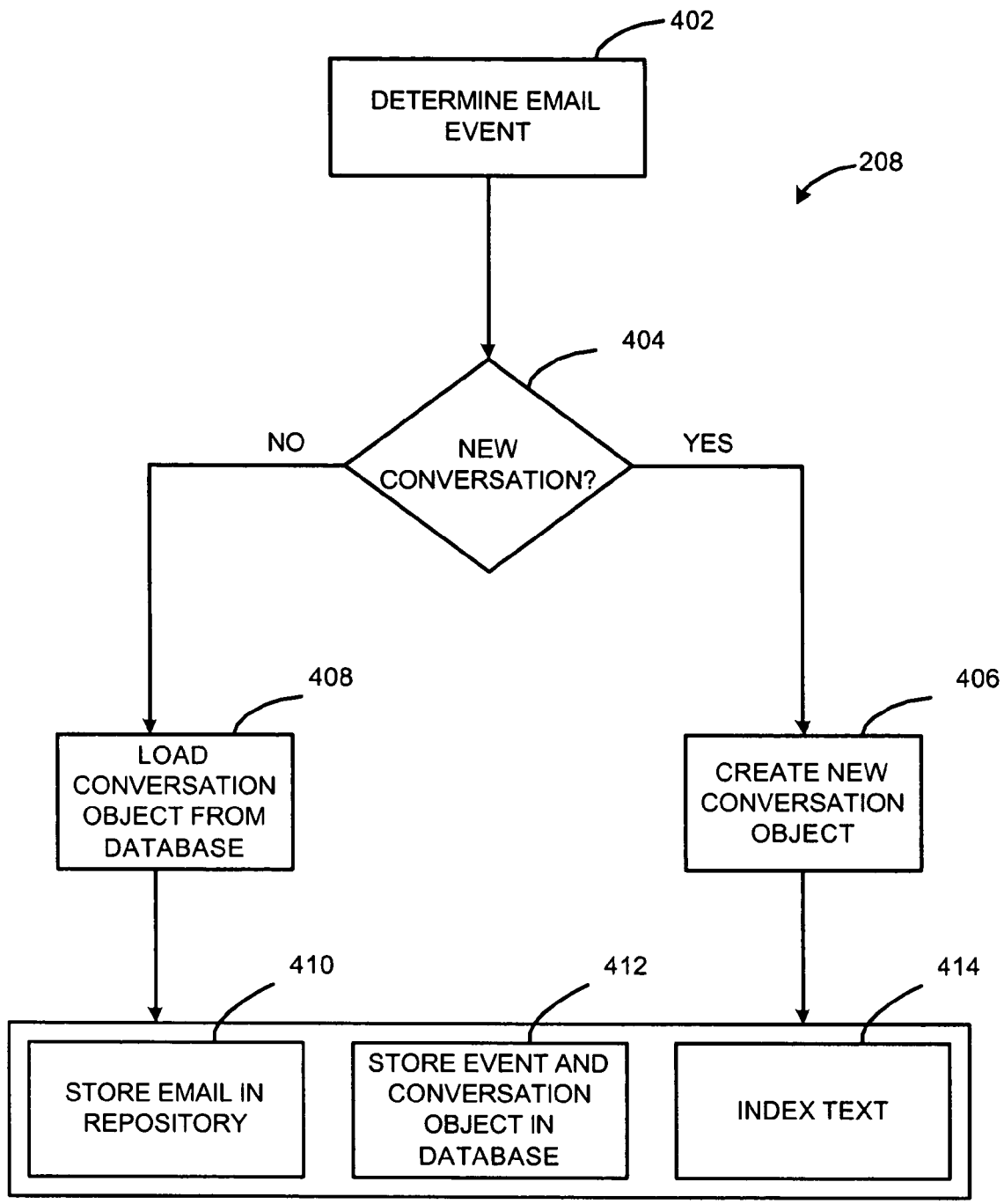
FIG. 4 is a flow diagram illustrating an exemplary method of indexing an email event in one embodiment of the present invention.

FIG. 4 illustrates an exemplary method 210 for indexing and storing an email event. In 402, the indexer 130 retrieves an email event from the queue 126 and determines that the event is an email event. In one embodiment, the indexer 130 can determine if the retrieved email event is a duplicate of a previously processed email event, and if not can assign the email event an event ID. The indexer 130 can also parse out indexable terms, including one or more of sender and recipient names, subject, message body and attachments, times and dates associated with the event, and a conversation ID from the event data, which can include the content of the email message and attachments, advertisements or other information associated with the email message.

In 404, the indexer 130 determines whether the email event is associated with a new conversation or if the email event is associated with an existing conversation. The indexer 130 can compare the conversation ID associated with the email event with previously indexed conversation IDs to make this determination.

If the indexer 130 determines that the email event is associated with a new conversation, then the indexer 130, in 406, can create a new conversation object. A conversation object can associate an email event with related email events from the same conversation.

If the indexer 130 determines that the email event is associated with an existing conversation, then the indexer 130, in 408, can load the relevant conversation object from the database 144 of the data store 140. By associating email events with a conversation, a user is able to search for and retrieve complete email conversations. Also the indexer 130 can determine "related" messages and conversations, different than the current conversations, and create associations between them.

Once the event has been associated with a conversation object and provided with a conversation object identifier, the email event can be stored in the data store 140. In 410, the email message can be stored in the repository 146. In 412, the event and conversation object can be stored in the database 144. In 414, the indexable terms from the email can be stored in the index 142. In one embodiment, the Event ID from the event is associated with terms in the index 142 that equate to the indexable terms of the event.

The capturing of email events that are indexed and stored by the search engine 122 allows the user 112a to search for and retrieve email messages on the client device 102a and allows the search engine to automatically search for email messages on the client device 102a.

The environment shown reflects a client-side search engine architecture embodiment. Other embodiments are possible, such as a stand-alone client device or a network search engine.

Similarly, while in some portions of the description, exemplary embodiments are described with reference to receipt of email messages, it will be appreciated from this foregoing description that the invention may in various embodiments process incoming and/or outgoing email messages.

Furthermore, the invention should not be limited to client-based or network-based (e.g., web-based or browser-based) email applications, but may be implemented in a variety of email applications, including client-based, web/network-based, or a combination client-network email application.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method comprising:
   identifying event data associated with an email message;
   compiling, by an indexer, a real time email event from at least some of the event data;
   identifying a historical event representing an event that occurred at a time when the indexer was not available to determine an occurrence of the historical event in real time;
   responsive to a policy of prioritizing real time events over historical events, processing the real time email event before processing the historical event, the processing of the real time email event comprising:
      determining based at least in part on the event data that the real time email event is related to a first conversation comprising a first thread of related email messages;
      analyzing a time gap between the real time email event and the email messages in the first conversation;
      analyzing an email attachment associated with the email message to determine a topic of the email message;
      responsive to the time gap being less than a certain amount of time and the determined topic matching a topic of an email message in the first conversation:
         associating the real time email event with the first conversation; and
         storing the real time email event, the association with the first conversation, and the email message; and
      responsive to the time gap exceeding the certain amount of time:
         associating the real time email event with a new conversation; and
         storing the real time email event, the association with the new conversation, and the email message.

2. The method of claim 1, wherein the at least one transfer comprises receiving the email message.

3. The method of claim 1, wherein the at least one transfer comprises sending the email message.

4. The method of claim 1, wherein the email message is sent using an email application that comprises a client-based email application.

5. The method of claim 1, wherein the email message is sent using an email application that comprises a network-based email application.

6. The method of claim 1, wherein the email message is sent using an email application that comprises a client-based email application and a network-based email application.

7. The method of claim 1, further comprising determining an occurrence of a condition indicating transfer of the email message by an email application, comprising determining if files associated with the email application have been updated.

8. The method of claim 1, further comprising determining an occurrence of a condition indicating transfer of the email message by an email application, comprising determining if an email related operating system condition has occurred.

9. The method of claim 8 wherein the operating system condition comprises an email icon output on a display associated with a client device.

10. The method of claim 8 wherein the operating system condition comprises an email message box output on a display associated with a client device.

11. The method of claim 8 wherein the operating system condition comprises determining metadata for an email indicator associated with the email message displayed in the email application.

12. The method of claim 1, wherein an email application used to transfer the email message comprises a network-based email application and determining the occurrence of a condition indicating the transfer of the email message by an email application comprises analyzing a web page associated with the network-based email application.

13. The method of claim 1, further comprising determining an occurrence of a condition indicating transfer of the email message by an email application, comprising determining if a packet or packets received from a network comprises an email protocol.

14. The method of claim 1, further comprising determining an occurrence of a condition indicating transfer of the email message by an email application, comprising determining an email protocol and an email server based on analysis of settings associated with an email application that transfer the email message or network traffic.

15. The method of claim 14 further comprising periodically polling the email server for new email messages.

16. The method of claim 1, wherein determining based at least in part on the event data that the real time email event is related to a first conversation comprises:
   determining if an existing conversation relevant to the real time email event exists.

17. The method of claim 16, wherein determining if an existing conversation relevant to the real time email event exists comprises an analysis of the event data associated with the real time email event.

18. The method of claim 17 wherein the analysis of the event data comprises analysis of one or more of email message subject, date, content, sender and recipients.

19. The method of claim 16, wherein determining if an existing conversation relevant to the real time email event exists comprises determining a conversation ID associated with the email message.

20. The method of claim 1, wherein event data comprises at least one of sender data, a date and time associated with the event, and content from the email message.

21. The method of claim 1, wherein event data comprises a conversation ID.

22. A non-transitory computer-readable storage medium containing program code, comprising:
   program code for determining in real time by a process external to an email application an occurrence of a condition indicating at least one transfer of an email message by the email application;
   program code for identifying event data associated with the email message;

program code for compiling a real time email event from at least some of the event data;
program code for identifying a historical event representing an event that occurred at a time when the external process was not available to determine an occurrence of the historical event in real time;
program code for processing the real time email event before processing the historical event responsive to a policy of prioritizing real time events over historical events, the processing of the real time email event comprising:
program code for determining based at least in part on the event data that the real time email event is related to a first conversation comprising a first thread of related email messages;
program code for analyzing a time gap between the real time email event and the email messages in the first conversation;
program code for, responsive to the time gap being less than a certain amount of time:
associating the real time email event with the first conversation; and
storing the real time email event, the association with the first conversation, and the email message; and
program code for, responsive to the time gap exceeding the certain amount of time:
associating the real time email event with a new conversation; and
storing the real time email event, the association with the new conversation, and the email message.

23. The non-transitory computer-readable storage medium of claim 22, wherein the at least one transfer comprises receiving the email message.

24. The non-transitory computer-readable storage medium of claim 22, wherein the at least one transfer comprises sending the email message.

25. The non-transitory computer-readable storage medium of claim 22, wherein the email application comprises a client-based email application.

26. The non-transitory computer-readable storage medium of claim 22, wherein the email application comprises a network-based email application.

27. The non-transitory computer-readable storage medium of claim 22, wherein the email application comprises a client-based email application and a network-based email application.

28. The non-transitory computer-readable storage medium of claim 22, wherein program code for determining the occurrence of the condition comprises determining if an email related operating system condition has occurred.

29. The non-transitory computer-readable storage medium of claim 28, wherein the operating system condition comprises an email icon output on a display associated with a client device.

30. The non-transitory computer-readable storage medium of claim 28, wherein the operating system condition comprises an email message box output on a display associated with a client device.

31. The non-transitory computer-readable storage medium of claim 28, wherein the operating system condition comprises determining metadata for an email indicator associated with the email message displayed in the email application.

32. The non-transitory computer-readable storage medium of claim 22, wherein the email application comprises a network-based email application and program code for determining the occurrence of the condition comprises analyzing a web page associated with the network-based email application.

33. The non-transitory computer-readable storage medium of claim 22, wherein program code for determining the occurrence of the condition comprises determining if a packet or packets received from a network comprises an email protocol.

34. The non-transitory computer-readable storage medium of claim 22, wherein program code for determining the occurrence of the condition comprises determining an email protocol and an email server based on analysis of settings associated with the email application or network traffic.

35. The non-transitory computer-readable storage medium of claim 34, further comprising program code for periodically polling the email server for new email messages.

36. The non-transitory computer-readable storage medium of claim 22, wherein associating the real time email event with a first conversation comprises:
program code for determining if an existing conversation relevant to the real time email event exists.

37. The non-transitory computer-readable storage medium of claim 36, wherein program code for determining if an existing conversation relevant to the real time email event exists comprises an analysis of the event data associated with the real time email event.

38. The non-transitory computer-readable storage medium of claim 37, wherein the analysis of the event data comprises analysis of one or more of email message subject, data, content, sender and recipients.

39. The non-transitory computer-readable storage medium of claim 36, wherein program code for determining if an existing conversation relevant to the real time email event exists comprises determining a conversation ID associated with the email message.

40. The non-transitory computer-readable storage medium of claim 22, wherein event data comprises at least one of sender data, a date and time associated with the event, and content from the email message.

41. The non-transitory computer-readable storage medium of claim 22, wherein event data comprises a conversation ID.

42. A computer-implemented method comprising:
determining in real time, by a process external to an email application, an occurrence of a condition indicating that at least one email message has been received by the email application;
identifying the email message, wherein the email message comprises event data;
compiling a real time email event from at least some of the event data;
identifying a historical event representing an event that occurred at a time when the external process was not available to determine an occurrence of the historical event in real time;
responsive to a policy of prioritizing real time events over historical events, processing the real time email event before processing the historical event, the processing of the real time email event comprising:
indexing the real time email event, wherein indexing the real time email event further comprises:
determining that the real time email event is related to a first conversation comprising a first thread of related email messages;
analyzing a time gap between the real time email event and the email messages in the first conversation;
responsive to the time gap being less than a certain amount of time:

associating the real time email event with the first conversation; and storing the real time email event, the association with the first conversation, and the email message; and responsive to the time gap exceeding the certain amount of time:

associating the real time email event with a new conversation; and storing the real time email event, the association with the new conversation, and the email message.

43. The method of claim 42 wherein the email application comprises a client-based email application.

44. The method of claim 42 wherein the email application comprises a network-based email application.

45. A system, comprising:

indexer means for determining, by an indexer in real time, an occurrence of a condition indicating at least one transfer of an email message by an email application;

means for identifying event data associated with the email message;

means for compiling a real time email event from at least some of the event data; and means for identifying a historical event representing an event that occurred at a time when the indexer was not available to determine an occurrence of the historical event in real time real;

means for processing the real time email event before processing the historical event responsive to a policy of prioritizing real time events over historical events, the processing of the real time email event comprising:

means for determining based at least in part on the event data that the real time email event is related to a first conversation comprising a first thread of related email messages;

means for analyzing a time gap between the real time email event and the email messages in the first conversation;

means for analyzing an email attachment associated with the email message to determine a topic of the email message;

means for, responsive to the time gap being less than a certain amount of time and the determined topic matching a topic of an email message in the first conversation:

associating the real time email event with the first conversation; and storing the real time email event, the association with the first conversation, and the email message; and means for, responsive to the time gap exceeding the certain amount of time:

associating the real time email event with a new conversation; and storing the real time email event, the association with the new conversation, and the email message.

46. The system of claim 45 wherein the email application comprises a client-based email application.

47. The system of claim 45 wherein the email application comprises a network-based email application.

48. The method of claim 1, wherein determining based at least in part on the event data that the real time email event is related to the first conversation comprises analyzing a message body of the email message to determine a topic of the email message.

49. The method of claim 1, wherein email messages in the first thread of related email messages each have at least some subject text in common.

50. The non-transitory computer-readable storage medium of claim 22, wherein determining based at least in part on the event data that the real time email event is related to the first conversation comprises analyzing a message body of the email message to determine a topic of the email message.

51. The non-transitory computer-readable storage medium of claim 22, wherein determining based at least in part on the event data that the real time email event is related to the first conversation comprises analyzing an email attachment of the email message to determine a topic of the email message.

52. The non-transitory computer readable storage medium of claim 22, wherein email messages in the first thread of related email messages each have at least some subject text in common.

53. The method of claim 1, further comprising associating the real time email event with a second conversation related to the first conversation, the second conversation comprising a second thread of related email messages that lacks the real time email event.

54. The non-transitory computer readable storage medium of claim 22, further comprising associating the real time email event with a second conversation related to the first conversation, the second conversation comprising a second thread of related email messages that lacks the real time email event.

55. The non-transitory computer-readable storage medium of claim 22, wherein the file associated with the email application is a file associated with an email folder of the email application, the file containing email messages of the email folder.

56. The computer-implemented method of claim 42, wherein the files associated with the email application are files associated with email folders of the email application, the files containing email messages of the email folders.

57. The computer-implemented method of claim 1, further comprising determining an occurrence of a condition indicating transfer of the email message by an email application in real time by a capture processor, and wherein the historical event occurred during a period of time prior to the occurrence.

58. The computer-implemented method of claim 1, wherein identifying the historical event comprises requesting that a client application retrieve articles from a remote server.

59. A method comprising:

determining, by an indexer in real time, an occurrence of a condition indicating at least one transfer of an email message by an email application;

identifying event data associated with the email message;

compiling a real time email event from at least some of the event data;

identifying a historical event representing an event that occurred at a time when the indexer was not available to determine an occurrence of the historical event in real time; and responsive to a policy of prioritizing real time events over historical events, processing the real time email event before processing the historical event, the processing of the real time email event comprising:

determining based at least in part on the event data that the real time email event is related to a first conversation comprising a first thread of related email messages, analyzing a time gap between the real time email event and the email messages in the first conversation, responsive to the time gap being less than a certain amount of time, associating the email message with the first conversation, and responsive to the time gap exceeding the certain amount of time, associating the email message with a new conversation.

60. The method of claim 1, wherein the historical event represents an event that occurred before installation of the indexer

61. The method of claim 59, wherein the historical event represents an event that occurred before installation of the indexer.

\* \* \* \* \*